United States Patent [19]

West et al.

[11] 4,410,076

[45] Oct. 18, 1983

[54] DUST SUPPRESSOR

[75] Inventors: Joe B. West, Blue Island; Donald G. Van Camp, Crete, both of Ill.

[73] Assignee: Metcalf Construction Company, Hammond, Ind.

[21] Appl. No.: 231,221

[22] Filed: Feb. 2, 1981

[51] Int. Cl.³ .......................................... B65G 11/20
[52] U.S. Cl. .................................................. 193/32
[58] Field of Search ................. 193/2 R, 2 D, 32, 30;
406/83, 157, 159, 177, 180, 154, 192; 222/491;
239/452, 455, 533.1, 570; 414/291

[56] References Cited

U.S. PATENT DOCUMENTS 410,502 9/1889 Donner .............................. 193/2 R

FOREIGN PATENT DOCUMENTS 597118 6/1931 Fed. Rep. of Germany ........ 193/32

Primary Examiner—Andres Kashnikow
Assistant Examiner—Gene A. Church
Attorney, Agent, or Firm—Lee, Smith & Jager

[57] ABSTRACT

A dust suppressor for reducing or substantially eliminating dust in the loading of a particulate commodity, operating on a "dead box" principle but without the use of power operated valves. The dust suppressor normally operates on a three-stage principle, the first stage utilizing an adjustable damper valve which slows the velocity of flow, the second stage comprising a fixed deflector which directs and initially smooths the flow, and the third stage comprising a counterweighted, automatically operating butterfly valve which finally shapes and smooths the flow. Maximum dust suppression is obtained because dust cannot escape the dust suppressor without being forced back into the grain flow, because the velocity of the grain flow is reduced and because the grain flow discharged from the dust suppressor is smooth, non-turbulent and shaped.

14 Claims, 8 Drawing Figures

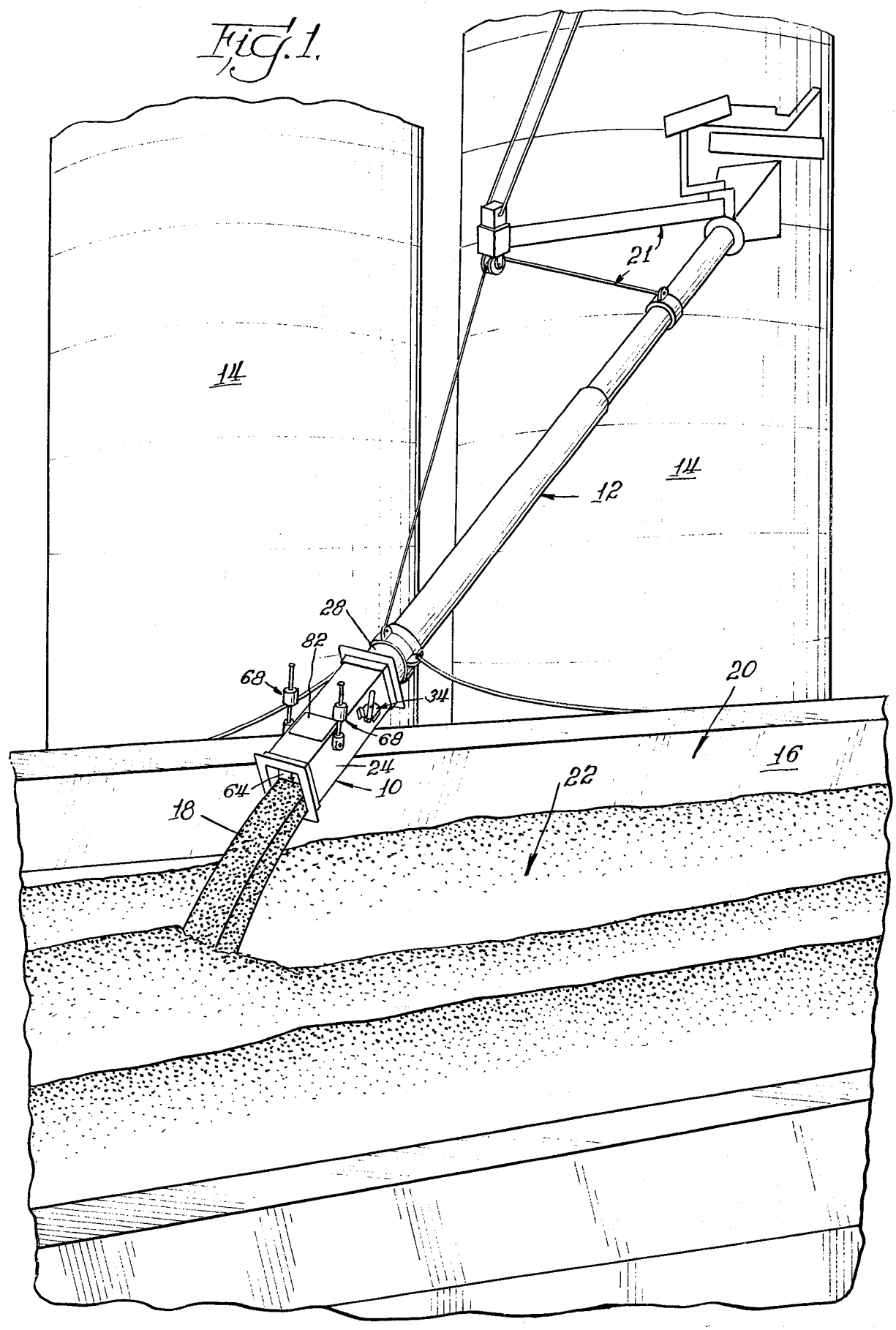

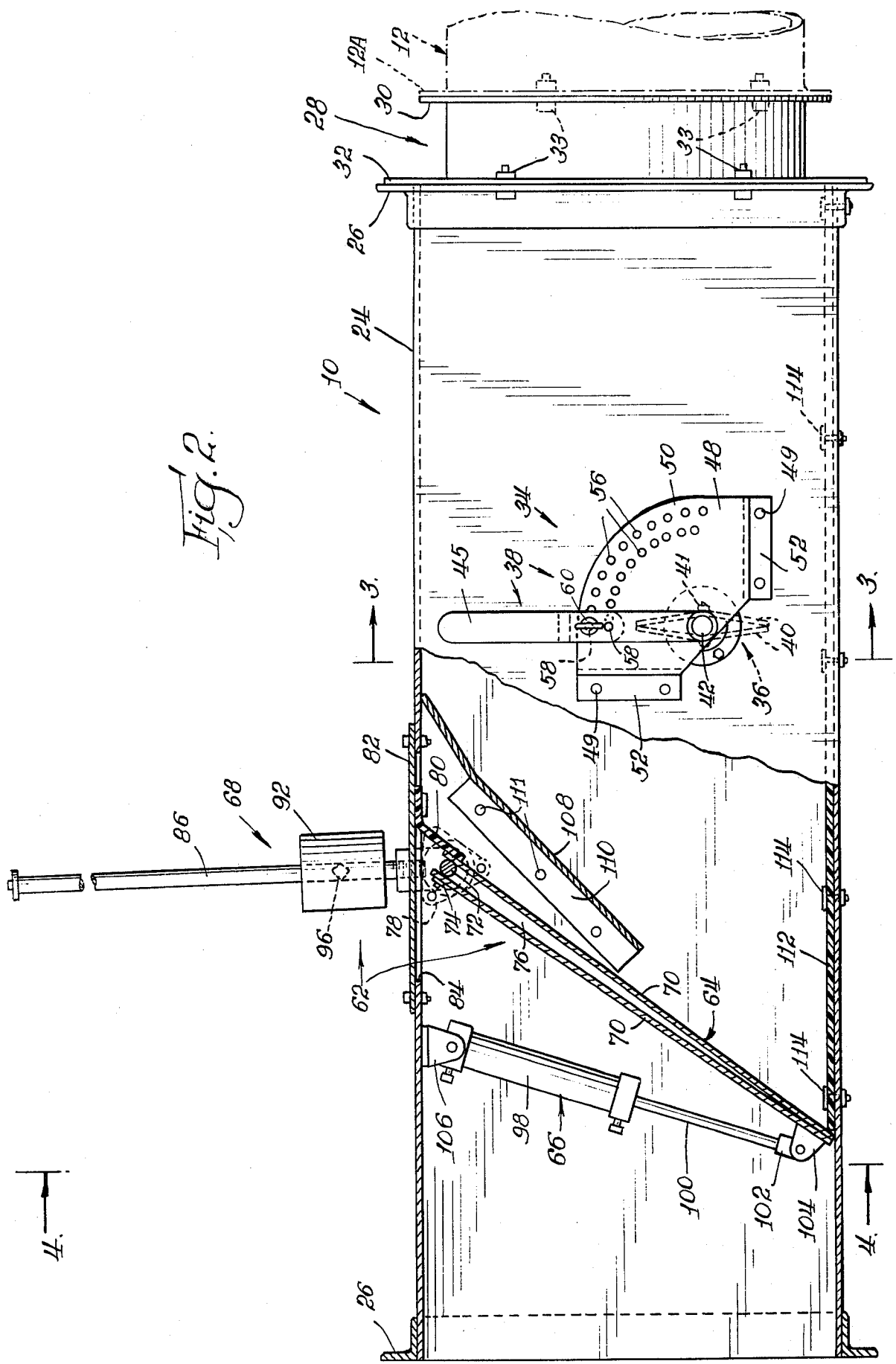

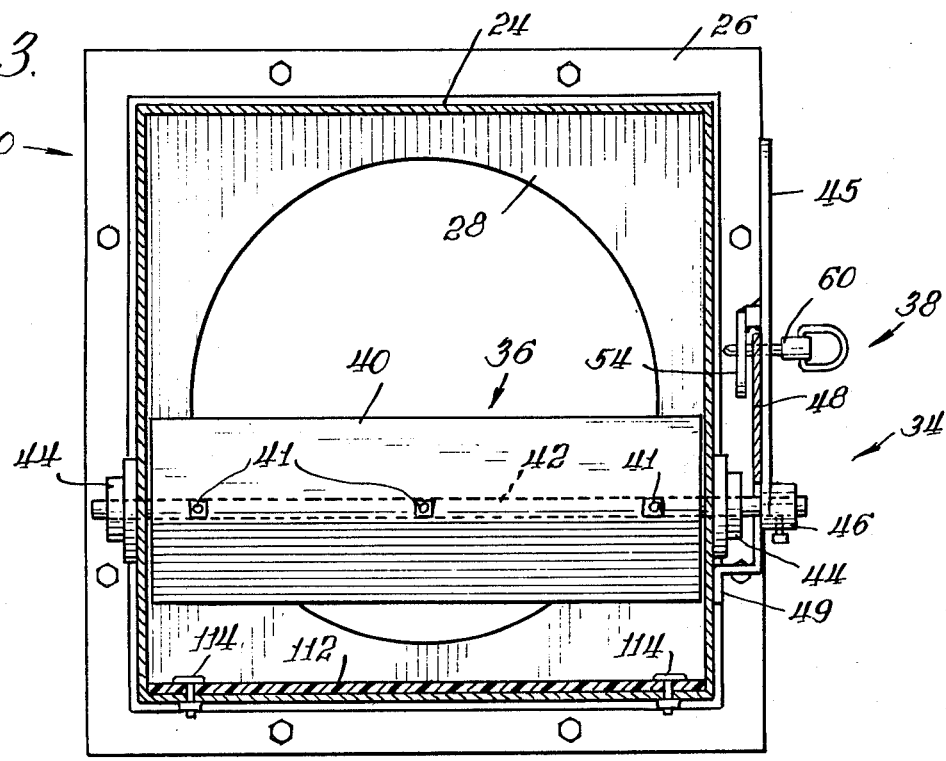
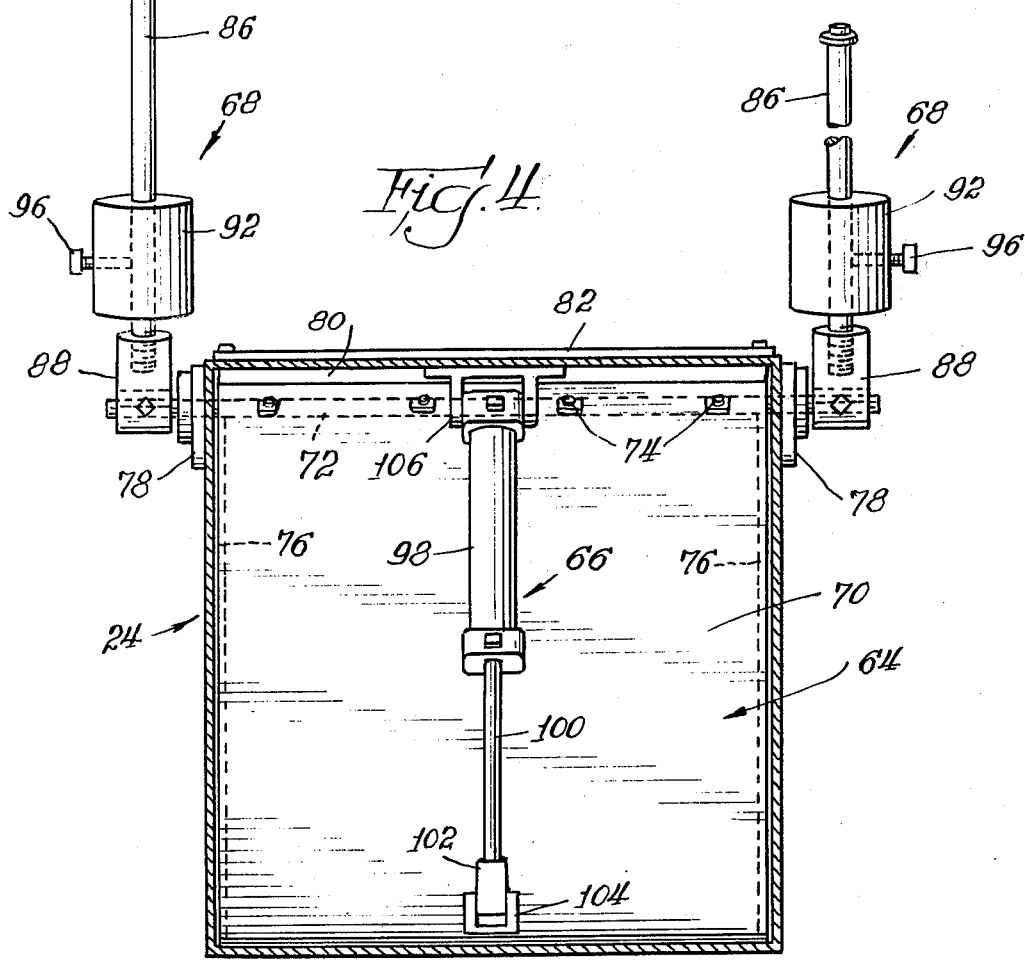

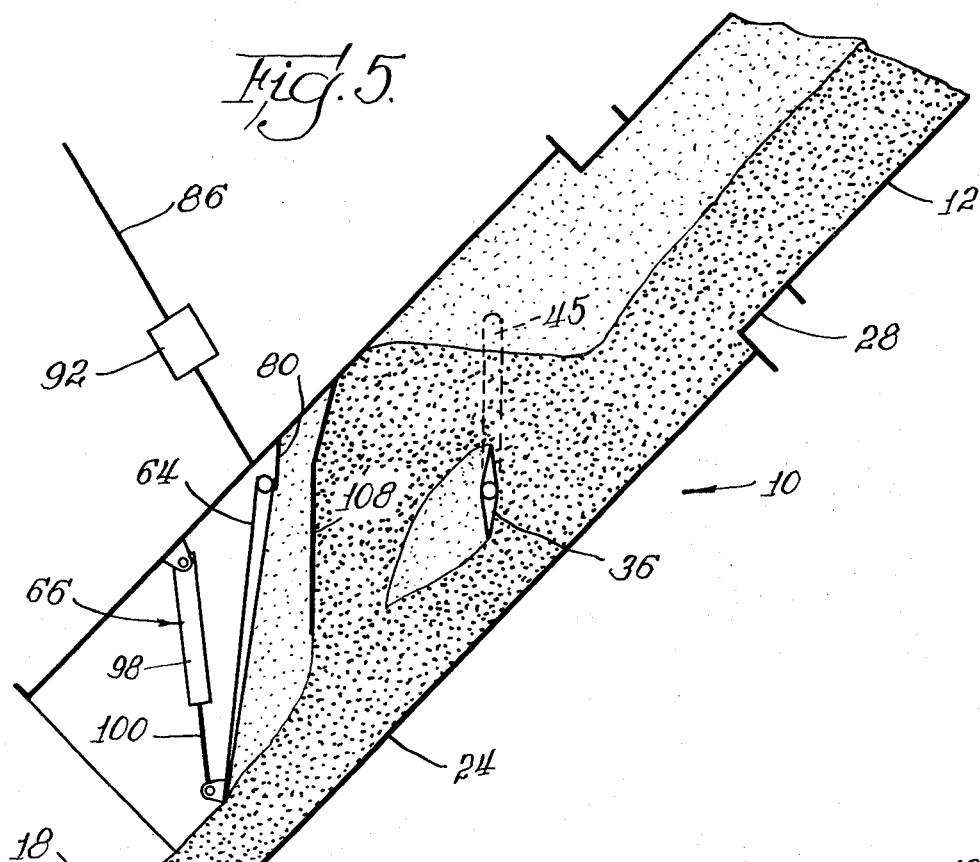
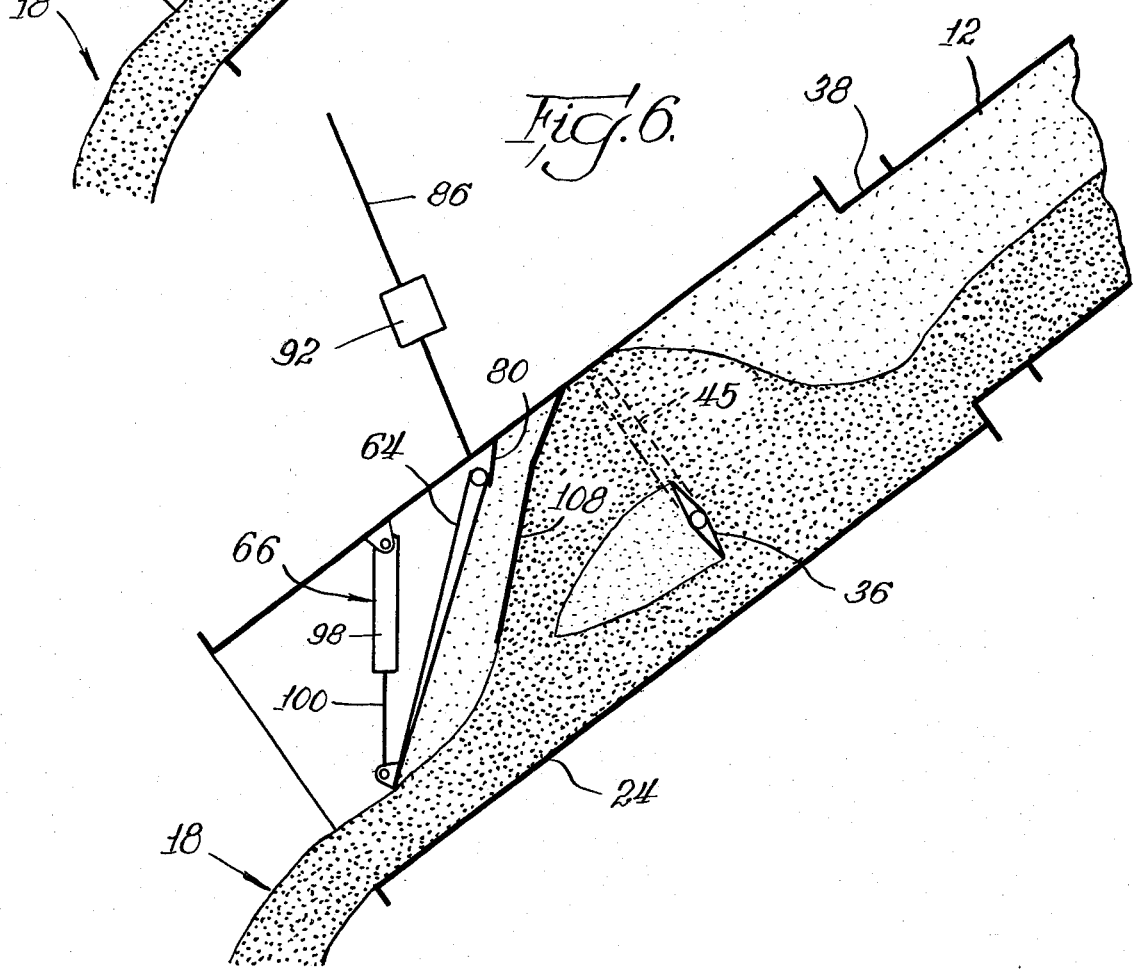

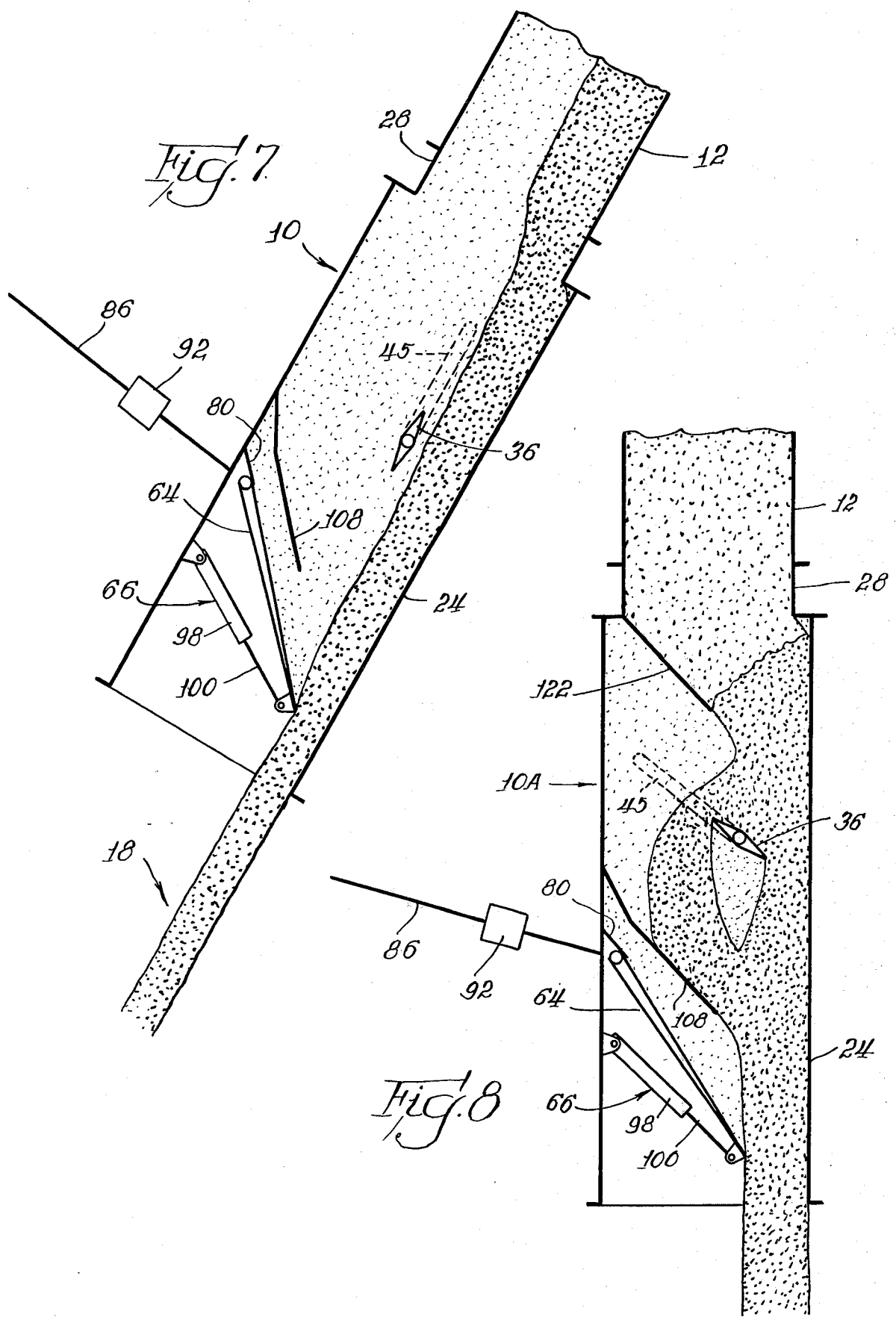

DUST SUPPRESSOR

TECHNICAL FIELD

The invention relates to an apparatus for suppressing the discharge of dust during the transfer of a commodity such as grain from a storage facility into a transport facility. Grain received from growers is usually stored in grain elevators from which it must be discharged into transport facilities such as ships, barges, rail cars or trucks for shipment to consumers or to remote storage facilities. During the handling prior to discharge of grain, dust is created, which dust is environmentally objectionable when expelled into the atmosphere.

BACKGROUND ART

In recent years federal and state authorities have imposed severe restrictions in respect of the amount of dust which is permissible when a particulate commodity such as grain is discharged from a storage facility such as a grain elevator into a transport facility. This has lead to development of dust suppressors for attachment to the discharge ends of grain elevator discharge spouts. Applicants have not conducted a search of the patented art and they do not not have detailed knowledge of the construction and operation of other dust suppressors. However, they do have general knowledge of three prior art dust suppressors.

One such prior art dust suppressor is that of Cargill, Inc. As understood by applicants, the Cargill suppressor operates on an induced draft aspiration principle, drawing off the dust created as the grain flows downward in a grain spout from the elevator and in some fashion forcing the dust back into the grain. It is understood by applicants that the Cargill dust suppressor weighs between 700 to 1,000 pounds as compared with 300 pounds for applicants' dust suppressor of the same grain flow capacity.

A second prior art dust suppressor generally known to applicants is that of Buhler-Miag. Reportedly, the Buhler-Miag suppressor utilizes electrically operated gate valves for creating a "dead box" effect to reduce the dust discharged from the end of the grain spout. It has also been reported to applicants that the Buhler-Miag dust suppressor of comparable flow capacity to that of the applicants weighs approximately 2,500 pounds.

A third dust suppressor of the prior art generally known to the applicants is that of GEM. Applicants have been informed that the GEM suppressor operates in a fashion somewhat similar to that of Buhler-Miag, utilizing electrically operated gate valves. It is understood that the GEM suppressor of a capacity similar to applicants' suppressor weighs in the neighborhood of 6,000 pounds.

DISCLOSURE OF INVENTION

Typically, a large amount of dust is created during pre-discharge handling of particulate commodities such as grain. This dust is expelled into the atmosphere as the grain or other particulate commodity travels downwardly in an ordinary discharge spout of a storage facility. In order to comply with federal and state environmental requirements, means must be utilized to reduce the amount of dust which is expelled into the atmosphere.

Applicants have invented a dust suppressor for mounting at the discharge end of a spout. The suppressor operates on a "dead box" principle, but the dead box effect is obtained without the use of any power-operated valves. The suppressor is in the form of an elongated housing of generally square cross-section. A manually adjustable damper valve within the housing slows the flow of grain, and a counterweighted butterfly valve downstream of the damper valve automatically opens to a point just sufficient to permit a solid stream of grain to be discharged. The dust within the housing is forced back into the grain before discharge so that the grain discharged is essentially dust-free.

The speed of the flowing grain in applicants' dust suppressor is reduced by the damper valve to aproximately one-half of the speed of the grain in the spout. In addition, the turbulence of the grain flow is substantially reduced with the result that the flow discharged from the suppressor is smooth. The grain in the suppressor downstream of the damper valve forces the counterweighted butterfly valve to open, and the butterfly valve causes the flowing grain to assume a shape of rectangular cross-section just sufficient in area to acommodate the grain flow. Accordingly, essentially no free grain dust is discharged with the grain. Also, because of the reduced speed of flow and the smooth, rectangularly discharge, very little dust is expelled in the free fall of the grain from the discharge end of the suppressor into a receiving receptacle, such as the hold of a ship.

BRIEF DESCRIPTION OF DRAWINGS

FIG. 1 is a fragmentary perspective view of a grain loading site, including a grain elevator with a loading spout in operation for dumping grain into the hold of a ship, and incorporating a dust suppressor according to the present invention.

FIG. 2 is an enlarged side view, partly in section and partly in elevation, of the dust suppressor according to the present invention.

FIG. 3 is a sectional view of the dust suppressor taken along line 3—3 of FIG. 2;

FIG. 4 is a sectional view of the dust suppessor taken along line 4—4 of FIG. 2;

FIG. 5 is a schematic sectional view showing the dust suppressor in operation at a normal, high volume flow condition;

FIG. 6 is a schematic sectional view of the dust suppressor in operation at a reduced volume flow condition;

FIG. 7 is a schematic sectional view similar to FIGS. 5 and 6 showing the dust suppressor in operation at a steep angle, maximum flow condition; and FIG. 8 is a schematic sectional view of another embodiment of the dust suppressor adapted for vertical flow operation.

BEST MODE OF CARRYING OUT THE INVENTION

The dust suppressor of the present invention, generally designated by the reference numeral 10, is shown in FIG. 1 attached at the discharge end of a loading spout 12 which is connected in discharge position to a storage facility for a particulate commodity, such as a silo or surge bin 14. Typically, one or more surge bins 14 are disposed on the edge of a waterway so that a ship 16, (only a fragment of which is shown) can be moored along side to permit the discharge of the commodity, such as grain 18, into a hold 20 of the ship.

The upper end of the loading spout 12 is attached to the surge bin 14 and a gate control valve (not shown) is provided at the surge bin to stop the flow of grain when closed and to permit flow into the spout when opened.

In the customary manner, the spout may be supported in cantilever fashion by a boom and cable system 21 as shown, which is conventional and forms no part of the present invention. The boom and cable system also controls the angle of incline of the spout 12 and its lateral position. The spout 12 is moved about laterally and is shortened or lengthened in the conventional fashion as required in order to evenly distribute grain 22 which is deposited in the hold 20.

The construction of the dust suppressor 10 is depicted in detail in FIGS. 2, 3 and 4. The suppressor includes a housing in the form of an elongated, box-like sheet metal housing or body 24 of square cross-section. In a typical medium flow capacity model of dust suppressor, the housing 24 is approximately 22½" high, 22½" wide and 5' long, formed of 3/16" thick aluminum alloy of welded construction. Stiffening and support collars 26 are fixedly secured at each end of the body 24. The stiffening collars may be formed of L-shaped angles of the same aluminum alloy as the body 24, welded in place as shown.

A transition collar 28 is provided at the upstream end of the dust suppressor 10 in order to permit the suppressor to be attached to the discharge end of the elevator discharge spout 12. The transition collar may be typically formed of 3/16" hot rolled steel. Its configuration with vary to suit the configuration of the spout 12 to which it is attached. In the example shown, the spout 12 is of round cross-section with a flange 12A formed at the discharge end. The transition collar 28 is formed with a flange 30 at the upstream end which is complementary to the flange 12A of the spout and with a flange 32 at the other end which is complementary to the stiffening collar 26 of the body 24 at the upstream end. Typically, the transition collar 28 is secured to the spout 12 and to the dust suppressor 10 by means of suitable bolts 33 in order to permit ready removal and substitution of a different transition collar for adapting to a spout of a different configuration.

A damper assembly 34 is provided as a portion of the dust suppressor 10 for restricting and controlling the flow of grain through the suppressor when in operation. The damper assembly 34 comprises a damper valve 36 disposed within the housing 24, and a valve position adjustment assembly 38 disposed outside of the housing at one side.

The damper valve 36 is formed by a pair of formed, elongated aluminum alloy plates 40 secured by bolts 41 on opposite sides of a shaft 42. As best seen in FIG. 3, the end portions of the shaft 42 extend beyond the plates 40 forming the damper valve through the opposite side walls of the body 24 and are journalled in flange bearings 44 of conventional construction which are secured by bolts (not shown) on the outside of the body 24 on the opposite sides.

The valve adjustment assembly 38 includes an adjustment handle 45 in the form of a flat steel bar which has its lower end portion fixedly secured to one end of the shaft 42, for example, by having a steel collar 46 welded to the handle, which in turn is fixedly secured to the shaft 42 by means of a conventional keystock and keyway attachment. The adjustment handle 45 is secured to the control shaft 42 in a position so that it is parallel to the damper valve 36, as best seen in FIG. 2, in order that the position of the valve can be determined by observing the position of the handle.

In order to permit adjustment of the position of the damper valve 36 between a vertical, maximum restriction position as shown in FIG. 2 and a horizontal full opened position as shown schematically in FIG. 7, a positioning bracket 48 is fixedly secured by bolts 49 or the like on the side wall of the body 24 adjacent the adjustment handle 45. The bracket 48 includes a central sector portion 50 and a pair of integral stand-off feet 52 at opposite ends, by means of which the bracket is attached to the side wall by the bolts 49. The stand-off feet are formed so that the sector portion 50 is spaced laterally outwardly from the side wall of the body 24 with its outward surface adjacent the inward surface of the adjustment handle 45 (as best seen in FIG. 3). A keeper finger 54 has an upper portion welded to the handle 45 in a position spaced outwardly to clear the sector 50. A cantilever portion of the keeper finger overlaps the sector 50 on the opposite side thereof from the handle.

In order to permit digital adjustment of the position of the handle 38 two quarter-circle rows of adjustment holes 56 are formed in the sector portion 50, and two holes 58 of the same size are formed through the handle 45 and the keeper finger 54 at positions corresponding to positions of the two rows of holes 56. A self-locking pin 60 is adopted to be selectively inserted through an aligned set of holes 56 and 58 as shown in FIGS. 2 and 3. In the particular embodiment shown, ten equally spaced holes 56 are provided in the inner quarter-circle and eleven equally spaced holes 56 are provided in the outer quarter-circle, and the holes of the two quarter-circles are staggered as shown. Accordingly, twenty-one different positions of the handle and of the damper valve 36 are permitted, thus providing 4½° increments of adjustability of the damper valve over the 90° adjustment span.

An automatically operable butterfly valve assembly 62 is disposed downstream of the damper valve assembly 34 to provide an automatic dust containment and flow shaping function during operation of the dust suppressor 10. The principal components of the automatic butterfly valve assembly are a butterfly valve 64 within the body 24, a shock absorber assembly 66 also within the body 24 and a double counterweight assembly 68 outside the body.

The butterfly valve 64 comprises a pair of aluminum alloy plates 70 which are secured along their upper edge portions on opposite sides to a pivot shaft 72 by means of a plurality of through bolts 74. Aluminum alloy fillers 76 are fixedly secured between the opposite edge portions of the plates 70 to close off the interior of the butterfly valve and to stiffen the edges. The opposite ends of the shaft 72 protrude through the side walls of the housing 24 near the top and are pivotally journalled in conventional flange bearings 78 which are bolted to the outside of the housing 24 in the positions shown in FIGS. 2 and 4. Accordingly, the butterfly valve is pivotally mounted at its upper edge portion, and its lower, free edge is adapted to bear against the bottom inner wall of the housing when the valve is closed as shown in FIG. 2.

A flexible rubber seal 80 is secured to the bottom surface of a cover plate 82 which in turn is bolted in place on top of the body portion 24 to close off an access opening 84. The rubber seal 80 has its free edge bearing against the upper edge portion of the butterfly valve 64 to prevent the escape of dust above the butterfly valve 64 when the dust suppressor 10 is in operation.

The counterweight assembly 68 comprises a pair of counterweight shafts 86 which are fixedly secured to the oppositely protruding end portions of the pivot shaft 72 of the butterfly valve 64. Each of the counterweight shafts is secured to the pivot shaft by means of a bracket 88 which is threadedly secured to the bottom end portion of each shaft. Each bracket 88 is fixedly secured to the respective end portions of the shaft 72 in any suitable fashion, for example, by a conventional keystock and keyway attachment (not shown). Each of the counterweight shafts 86 has an adjustable counterweight 92 of circular cross-section shiftably disposed on the shaft. A set screw 96 is threadly inserted through each counterweight 92 for bearing against the respective counterweight shafts 86 in order to permit the counterweights 92 to be adjustably but fixedly secured to the shafts 86 at any position along the shafts.

It will be noted that each of the counterweight shafts 86 is secured to the pivot shaft 72 in such a position that the shafts are tilted slightly forwardly at about 2° with respect to the longitudinal axis of the housing 24 when the butterfly valve 64 is completely closed as shown in FIG. 2. Thus, when the dust suppressor 10 is secured on the discharge end of the spout 12, the counterweight shafts 86 are tilted forwardly at an angle from the vertical which roughly corresponds to the degree of inclination of the discharge spout. It will be readily seen that when the dust suppressor 10 is in operation, adjustment of the counterweights 92 farther upwardly causes the butterfly valve 64 to be urged toward its closed position with greater force. It will also be noted that as the butterfly valve 64 is moved toward opened position, the counterweight shafts 86 are pivoted more toward the vertical so that the closing effect of the counterweights 92 is diminished with increasingly open positions of the butterfly valve.

The shock absorber assembly 66 is provided in order to inhibit surging of the flow of grain during operation of the dust suppressor 10. The shock absorber assembly includes a cylinder 98 with a piston rod 100 extending therefrom and having a piston (not shown) secured to the end of the rod 100 within the cylinder 98. The cylinder 98 and rod 100 are of conventional configuration, operating pneumatically to provide shock resistance or dampening when the piston rod 100 is extended with respect to the cylinder 98. However, the shock absorber is constructed so that there is essentially no resistance to movement when the piston rod 100 moves inwardly with respect to the cylinder. The cylinder 98 is provided with an adjustment device (not shown) in order to permit adjustment of the resistance to extension of the piston rod 100. Any one of several commercially available shock absorbers may be employed for the shock absorber assembly 66, for example, as manufactured by Bimba Manufacturing Co.

In order to secure the piston rod 100 to the butterfly valve 64, the outer end of the rod has a forked bracket 102 secured thereto which in turn is pivotally secured to a bracket 104. The bracket 104 is fixedly secured adjacent the bottom edge portion of the butterfly valve 64 in a central position as best seen in FIG. 4. The upper end portion of the cylinder 98 is pivotally secured to a bracket 106 which in turn is fixedly secured to the inside of the upper wall portion of the box 24 by means of bolts (not shown). The shock absorber assembly 66 is of such a size and configuration and the brackets 102 and 104 are so placed that when the butterfly valve 64 is fully closed as shown in FIGS. 2 and 4, the piston rod 100 is essentially fully extended.

A deflector plate 108 is secured within the housing 24 between the damper valve 36 and the butterfly valve 64. The deflector plate 108 is provided with integral attachment flanges 110 at each side (one shown), and the attachment flanges bear against the opposite inner sidewalls of the housing and are secured thereto by means of bolts 111. As seen in FIG. 2, the deflector plate 108 is located and canted in such a manner as to direct grain flow which passes above the damper valve 36 toward the lower portion of the butterfly valve 64.

A wear plate 112 is secured to the inner bottom surface of the housing 24 by means of a plurality of flat-headed bolts 114. The wear plate is located so that its downstream edge is adjacent to the bottom edge of the butterfly valve 64 when it is in its fully closed position as shown in FIG. 2. The wear plate 112 is formed of a tough, wear-resistant material such as "Rhino-Hyde" produced by Cargill, Inc.

Operation of the dust suppressor 10 of the present invention is best understood by reference to the schematic illustrations of FIGS. 5, 6, and 7. It will be understood that in order to cause the grain or other particulate commodity to flow, the spout 12 and the suppressor must be disposed at an angle greater than the angle of repose of the commodity, for example, at least 30° to 35° from the horizontal in the case of corn.

The normal flow condition of the dust suppressor is depicted in FIG. 5. When utilizing the dust suppressor with grain such as corn or wheat, the damper valve is adjusted at about a 45° angle to the direction of grain flow and the counterweights 92 are both set about one-third of the way up on the damper rods 86. In this condition the grain flows at about 35,000 and 40,000 bushels per hour. Because of the resistance created by the damper valve 36, the grain is backed up behind the damper valve and above it and impinges against the deflector plate 108 as shown. Proper adjustment of the damper valve 36 causes the forward velocity of the grain discharged from the dust suppressor to be reduced to about one-half of the velocity of the grain passing down the spout 12. The high speed of travel of the grain in the spout 12 and the turbulence of the flow in the spout causes the formation of a great deal of suspended dust which would be expelled in a cloud causing pollution of the atmosphere were it not for the action of the dust suppressor. When the flow is impeded by the damper valve and slowed down, a "dead box" effect is created tending to cause the dust to be forced back into the grain upstream of the butterfly valve 64.

As the grain passes the damper valve 36 and impinges against the deflector plate 108, the grain flow is directed downwardly toward the lower portion of the housing 24 and the lower portion of the butterfly valve 64. The flow becomes smoother and begins to be shaped, and the dust is further forced into grain.

Downstream of the deflector plate 108, in order to pass from the dust suppressor, the grain must force open the butterfly valve 64 since the counterweights 92 bias the butterfly valve toward the closed position. As will be seen, the amount of bias can be increased by raising the counterweights 92 farther upwardly. When the counterweights are properly adjusted with respect to the particular grain flow and the characteristics of the grain, the bottom edge of the butterfly 64 bears lightly on the upper surface of the flowing grain. This further smooths the flow and causes substantially all of the remaining dust to be forced back into the grain. It also causes the flowing grain to assume a smoothly packed rectangular cross-sectional configuration.

Because of the action of the shock absorber 66 the closing speed of the butterfly valve 64 is dampened, but the opening speed of the butterfly valve is essentially unimpeded. The effect of the shock absorber is to prevent surging in the flow of grain ejected from the dust suppressor, which surging tends to excessively agitate the grain and create dust. By reason of the "sweeping" action of the butterfly valve 64 and the dampening action of the shock absorber 66, the grain ejected from the dust suppressor 10, when properly adjusted, is in an unagitated condition. Because of the shaping of the grain and the reduced agitation, very little dust is emitted during free fall of the grain from the end of the dust suppressor into the receiving receptacle, such as the hold 20 depicted in FIG. 1. Any dust remaining above the grain flow immediately upstream of the butterfly valve 64 does not have sufficient mass to move the butterfly valve 64. Accordingly, in order to escape from the dust suppressor the remaining dust must rejoin the grain before it can escape from the dust suppressor.

When the dust suppressor is operating in an efficient, properly adjusted fashion as shown in FIG. 5, the velocity of grain flow ejected from the dust suppressor is approximately one-half the velocity of travel of the grain in the spout 12 by reason of the action of the damper valve 36 and the deflector plate 108. The deflector plate 108 provides a channelling and an initial smoothing effect on the grain flow. The final shaping and smoothing effect is accomplished by the counterweighted butterfly valve 64. Essentially all of the grain dust is forced back into the grain, and the grain flow 18 which emerges from the dust suppressor is smooth, non-turbulent and rectangularly shaped so that very little dust is formed in the free-fall into the receiving receptacle of the transport facility.

FIG. 6 schematically illustrates the dust suppressor 10 operating in a low volume flow condition, that is, about 15,000 to 20,000 bushels per hour for the model described in connection with FIGS. 2–4. In this condition the damper valve 36 is set at the maximum restriction position, perpendicular to the flow of the grain 18. The grain flow is impeded by the damper valve 36 and piles up above the damper valve and behind it, substantially filling the space behind the deflector 108. Because of the resistance created by the vertically disposed damper valve 36 the grain speed is very substantially reduced. The result is that the volume flow of grain is reduced to the maximum extent possible. Because of the reduced flow per unit time the butterfly valve 64 closes down more than in a normal flow condition as shown in FIG. 5. Again, the lower edge portion of the butterfly valve 64 "rides" or "wipes" the top surface of the flow of grain giving the grain which is discharged from the dust suppressor the characteristic rectangular shape and causing substantially all dust and foreign material to be forced back into the grain before it emerges from the dust suppressor.

A maximum grain flow condition is depicted in FIG. 7. This is the so-called "bypass" condition ordinarily used for trimming or for reaching remote positions in the hold of a ship. To achieve bypass flow, the damper valve 36 is moved so that it is essentially parallel to the direction of flow of the grain. Thus, all or substantially all of the grain flows through the dust suppressor below the damper valve and ordinarily does not impinge against the deflector plate 108. In this flow condition the only active mechanism is the butterfly valve 64 which automatically "rides" along the top surface of the flowing grain forcing the dust within the dust suppressor back into the grain. In this condition the velocity of flow of the ejected grain is essentially the same as the velocity of flow in the spout 12 since the butterfly valve creates only a minimum of resistance to the flow. Since the effect of the damper valve 36 and the deflector plate 108 are minimized, or are non-existent, the dust suppression action is not quite as effective as in the normal flow condition of FIG. 6 or the low volume flow condition of FIG. 5. Nevertheless, dust suppression is sufficient to meet minimum environmental requirements for trimming and reaching operations.

A modified dust suppressor according to the present invention is depicted schematically in FIG. 8, generally designated by the reference number 10A. The dust suppressor 10A is especially adapted for vertical operation, as shown, usually for loading trucks or rail cars. Only one modification is necessary in order to adapt the dust suppressor of FIGS. 1–7 for vertical operation, the addition of a baffle plate 122 upstream of the damper valve 36. The baffle plate 122 is secured at about a 45° angle to the grain flow and covers approximately 50% of the open space at the upstream end of the dust suppressor 10A. The baffle plate 122 may be similar to the deflector plate 108 and may be secured to the body 24 in the same fashion. The purpose of the baffle plate 122 is to force the grain dropping vertically in the spout 12 to be moved toward the damper valve 36 in order to make the damper valve as effective in vertical operation as it is in normal operation. Below the baffle plate 122 the construction of the dust suppressor 10A is identical to that of the dust suppressor 10 of the first embodiment, and the operation is essentially the same.

Variations and modifications may be effected without departing from the scope of the novel concepts of the present invention.

We claim:

1. A device for suppressing emission of dust into the atmosphere during flow of particulate commodities discharged from a loading spout comprising:
   (a) a housing receiving the flow of particulate commodity,
   (b) a normally-closed butterfly valve disposed within said housing and blocking said housing when in a closed position, and having a free edge portion adapted to be engaged by the flow of particulate commodity for opening the valve, and
   (c) bias means biasing said butterfly valve toward a closed position with a force just sufficient to cause said free edge portion to shape the flow of commodity into a relatively solid mass without substantially restricting the flow of the commodity as it passes by the free edge of said butterfly valve in the downstream direction to be discharged from the housing.

2. A device according to claim 1 including a damper mechanism in said housing upstream of said butterfly valve, and disposed in the grain flow so as to impede the flow by forcing the grain to flow around opposing edges thereof and thereby reduce the speed of flow of said particulate commodity before it reaches said butterfly valve.

3. A device according to claim 1 including a stationary deflector member disposed upstream of said butterfly valve and adapted to direct the flow of particulate commodity toward said free edge portion of the butterfly valve.

4. A device according to claim 2 including a stationary deflector member disposed between said butterfly valve and said damper mechanism and adapted to direct the flow of particulate commodity toward said free edge portion of the butterfly valve.

5. A device according to claim 2 including a stationary baffle member disposed upstream of said damper mechanism for directing the flow of particulate commodity toward said damper mechanism during operation of said device for discharging said commodity in a substantially vertical direction.

6. A device according to claim 1 in which said butterfly valve is pivotally mounted at an edge portion opposite to said free edge portion.

7. A device according to claim 1 in which said biasing means comprises a gravity-actuated counterweight arrangement.

8. A device according to claim 7 in which said gravity actuating counterweight arrangement is adapted for adjusting the biasing force to accommodate different conditions of flow of the particulate commodity.

9. A device according to claim 2 in which said damper mechanism is adjustable for varying the amount of reduction of speed of flow of the particulate commodity to accommodate different conditions of flow.

10. A device for suppressing emission of dust into the atmosphere during flow of particulate commodities discharged from a loading spout comprising:
   (a) a housing receiving the flow of particulate commodity,
   (b) a normally-closed butterfly valve pivotally mounted at first edge thereof, and having a free edge portion opposite said first edge and adapted to be engaged by the flow of particulate commodity for opening the valve, and
   (c) bias means biasing said butterfly valve toward a closed position with a force just sufficient to cause said free edge portion to shape the flow of commodity into a relatively solid mass as it is discharged from the housing, said bias means further including
      (c1) at least one rod fixedly secured to a portion of said butterfly valve outside said housing and generally perpendicular to the axis of pivoting of said valve, and
      (c2) a couterweight adapted for being secured on said rod at different positions for adjusting the biasing force to accommodate different conditions of flow of the particulate commodity.

11. A device for suppressing emission of dust into the atmosphere during flow of particulate commodities discharged from a loading spout comprising:
   (a) a housing receiving the flow of particulate commodity,
   (b) a normally-closed butterfly valve having a free edge portion adapted to be engaged by the flow of particulate commodity for opening the valve,
   (c) bias means biasing said butterfly valve toward a closed position with a force just sufficient to cause said free edge portion to shape the flow of commodity into a relatively solid mass as it is discharged from the housing, and
   (d) a damper mechanism upstream of said butterfly valve to reduce the speed of flow of said commodity before it reaches said butterfly valve, said damper mechanism including
      (d1) a valve plate mounted in said housing for pivoting about an axis generally perpendicular to the flow of said commodity, and
      (d2) valve position adjustment means adapted for locking said valve plate in any one of a plurality of damper positions between a minimum damper position generally parallel to the flow of particulate commodity and a maximum damper position generally perpendicular to the flow.

12. A device according to claim 11 in which said valve position adjustment means comprises:
   (a) a handle fixedly secured to said valve plate outside of said housing in a position generally parallel to said valve plate to permit adjustment of the damper position of said valve plate and to indicate the position of the valve plate, and
   (b) a locking mechanism for locking said handle in any one of a plurality of positions corresponding to said damper positions of said valve plate.

13. A device for suppressing emission of dust into the atmosphere during flow of particulate commodities discharged from a loading spout comprising:
   (a) a housing receiving the flow of particulate commodity,
   (b) a normally-closed butterfly valve having a free edge portion adapted to be engaged by the flow of particulate commodity for opening the valve,
   (c) bias means biasing said butterfly valve toward a closed position with a force just sufficient to cause said free edge portion to shape the flow of commodity into a relatively solid mass as it is discharged from the housing,
   (d) a damper mechanism upstream of said butterfly valve to reduce the speed of flow of said commodity before it reaches said butterfly valve, said damper mechanism further including
      (d1) an adjustable position valve disposed in said housing for varying the amount of reduction of speed of flow of the particulate commodity to accommodate different conditions of flow,
      (d2) a pivotal handle disposed outside said housing and operably connected to said valve for adjusting the position thereof, and
      (d3) a locking mechanism for locking said handle in any one of a plurality of positions for adjusting the position of said valve.

14. A device according to claim 13 including a stationary baffle member disposed upstream of said adjustable position valve for directing the flow of particulate commodity toward said valve during operation of said device for discharging said commodity a generally vertical direction.

* * * * *